United States Patent
Will

[19]

[11] Patent Number: 5,970,388

[45] Date of Patent: Oct. 19, 1999

[54] WIRELESS SYSTEM FOR INDICATING AN INCOMING TELEPHONE CALL AND CONTROLLING ITS TRANSFER

[76] Inventor: Craig A. Will, 5255 Stevens Creek Blvd., No. 240, Santa Clara, Calif. 95051

[21] Appl. No.: 08/773,964

[22] Filed: Dec. 26, 1996

[51] Int. Cl.[6] ....................................................... H04Q 7/20
[52] U.S. Cl. ......................... 455/31.2; 455/426; 455/456; 455/458; 455/414; 379/210
[58] Field of Search .................... 455/30.1, 31.2, 455/31.3, 414, 417, 426, 445, 456, 458, 459; 379/210–212; 340/825.44

[56] References Cited

U.S. PATENT DOCUMENTS

| | | |
|---|---|---|
| 3,439,320 | 4/1969 | Ward . |
| 4,601,064 | 7/1986 | Shipley . |
| 5,062,151 | 10/1991 | Shipley . |
| 5,151,930 | 9/1992 | Hagl . |
| 5,153,582 | 10/1992 | Davis . |
| 5,315,636 | 5/1994 | Patel ......................................... 455/445 |
| 5,428,663 | 6/1995 | Grimes et al. .......................... 455/31.2 |
| 5,479,408 | 12/1995 | Will . |
| 5,481,590 | 1/1996 | Grimes ................................... 455/31.2 |
| 5,588,009 | 12/1996 | Will . |
| 5,610,970 | 3/1997 | Fuller et al. ............................ 455/31.2 |

FOREIGN PATENT DOCUMENTS 2 265 038 9/1993 United Kingdom .

OTHER PUBLICATIONS

Weiser, The Computer for the 21st Century, Scientific American, Sep., 1991, pp. 94–104, vol. 265, No. 3.
Pountain, Track People with Active Badges, Byte, Dec., 1993, pp. 57–64.

*Primary Examiner*—Dwayne D. Bost
*Assistant Examiner*—Nay A. Maung

[57] ABSTRACT

A method and apparatus for routing an incoming telephone call to an individual in a building who is not in his or her office. The individual carries a wireless communications unit, typically incorporated in a clip-on badge, that receives messages and transmits both responses and periodic signals to allow tracking the location of the individual. When a call arrives, a message indicating the call is transmitted to the communications unit, which displays an indication of the call together with responses that can be selected to determine how the call is to be routed. Such responses include, in particular, locations of telephone instruments near the individual that the call can be routed to. If the individual selects a particular location, the response is transmitted back to a PBX to cause the appropriate routing.

14 Claims, 6 Drawing Sheets

WIRELESS SYSTEM FOR INDICATING AN INCOMING TELEPHONE CALL AND CONTROLLING ITS TRANSFER

CROSS-REFERENCE TO RELATED APPLICATIONS

This application relates to applications submitted by Craig A. Will entitled "Personal Paging, Communications, and Locating System", Ser. No. 08/191,111, entitled "Wireless Personal Paging, Communications, and Locating System", Ser. No. 08/200,065 (now U.S. Pat. No. 5,479, 408), and entitled "Control of Miniature Personal Digital Assistant Using Menu and Thumbwheel" (Ser. No, 08/423,690). The application that has issued as a patent (No. U.S. Pat. No. 5,479,408) is incorporated by reference into the present application.

FIELD OF THE INVENTION

This invention relates generally to electronic communication systems for sending signals selectively to portable receivers that provide an indication or alarm to specific individuals that is humanly perceptible, and further to systems that indicate the location of individuals. It relates to the transmission of message data encoded as digital pulses modulating a radio wave to portable receivers, and also relate, to the transmission of message data, identification, and location information using digital pulses optically, particularly by infrared light, and acoustically, particularly by ultrasound. The invention further relates to the indication of incoming calls from a telephone PBX system and the forwarding and transfer of such calls.

BACKGROUND

A frequent difficulty in an office or similar environment is communicating with a particular individual when they are not in their office but still in the building. This results not only in "telephone tag" where people continue back-and-forth attempts to return telephone calls, but also in its physical analog where one person visits the office of another, only to find that person to be gone.

One solution to this problem has been the increasingly widespread use of paging receivers, and such devices have become more and more miniaturized. Devices have been constructed, for example, that are the size of a credit card or that are included as part of a watch. Such systems, however, are typically one-way, transmitting only a telephone number, perhaps an additional short numeric code, or possibly a brief alphanumeric message, and are designed for use outside a building.

Within a building, there have been two general directions that system designs have taken. One is the use of radio paging systems within a building, which may be configured to allow receipt of electronic mail messages or to allow users to be notified that they have a call that they can then ask to be transferred to a nearby extension. For example, the Hagl invention (U.S. Pat. No. 5,151,930) transmits the fact of the incoming call and the telephone extension of the calling party by radio to a paging receiver, which indicates to the user that the call has come in and displays the number. The user then locates a telephone instrument and dials a code identifying the user, resulting in the incoming call being transferred to that instrument.

The other direction Is the use of automatic personal locating systems that determine where in a building an individual is, and that can automatically route a telephone call to the nearest extension. For example, the Ward invention (U.S. Pat. No. 3,439,320) describes a system that uses ultrasonic sound (using a different frequency for each person) to track the location of individuals in a building so that telephone calls may be routed to them. A number of variations exist using different media. Thus, the Shipley inventions (U.S. Pat. Nos. 4,601,064 and 5,062,151) track the location of individuals that carry devices that repeatedly transmit a digital identifying code via infrared light that is then received by remote sensors installed in individual rooms of a building, with a central computer that polls the remote sensors and determines the location of an individual. Telephone calls can then, if desired, be automatically forwarded to the individual by the PABX system. The individual can, using a switch on the identification device, turn off the forwarding function at a given time if it would be inconvenient.

These approaches have a number of drawbacks. One-way radio paging signals can fail to deliver a message if the user is in an especially noisy environment, is in a "dead spot" resulting from metal shielding o)r other interference, or goes outside the range of the transmitter. While these difficulties can be prevented by repeating all transmissions multiple times, this approach does not make efficient use of bandwidth and can also result in considerable delay in receipt of a paging signal or message. One-way communication also does not allow an originator to know whether a message has in fact been received by a user and read, or allow the user to respond. One-way systems that indicate to a user only that a call has come in require the user to find a telephone and dial sufficient digits to cause the call to be transferred, and typically require the caller to be placed on hold during this process, which may be annoying to the caller if the person being paged does not respond or takes a long time to do so.

Systems that automatically track the location of individuals and automatically transfer incoming telephone calls to that location tend to be intrusive, because they necessarily cause a transfer even in circumstances that might be inappropriate (such as transferring a call to an individual who is in an office of someone he or she does not know well or who is in a group meeting that might be disturbed).

The above difficulties are solved by the invention disclosed here (and related inventions) by its provision of both (1) two-way communication and (2) automatic tracking of the location of the individual. This combination allows responses to be sent which are chosen from a set provided with the original message, from a preprogrammed set, or composed by the user. Selection or composition of responses is made easy by use of a thumbwheel that allows display of messages and responses and their choice by pressing a single key (as is described in a copending application. The communication and tracking system makes possible the transfer of incoming telephone calls remotely by means of selection from a menu.

SUMMARY OF THE INVENTION

The goal of the invention disclosed here is to allow an individual located in a building to be informed of incoming telephone calls and to be able to route them to an appropriate telephone station near the individual, in the situation in which the individual is not in his or her office.

The individual carries a communications unit that is typically incorporated into an employee identification badge that is clipped to the clothing of the individual. Such a communications unit receives messages from a central station associated with a PBX by a wireless medium, and transmits responses back to the central station, also by wireless, either directly or indirectly. Provision is also made for tracking the location of the unit (and thus the individual) in the building, typically by remote stations installed throughout the building. A particularly effective communications system that allows both two-way communication and tracking is described in applications entitled "Personal Paging, Communications, and Locating System", Ser. No. 08/191,111, and entitled "Wireless Personal Paging, Communications, and Locating System", Ser. No. 08/200.065 (now U.S. Pat. No. 5,479, 408). These systems make use of radio to communicate from a central station to the communications unit, and infrared or ultrasound to communicate from the communications unit to one or more remote stations. Communication from the remote stations to the central station is carried out by physical cable (wire or optical fiber) in one invention (Ser. No. 08/191,111) and by radio in the other (U.S. Pat. No. 4,479,408). Infrared or ultrasound is particularly effective for tracking an individual because this media does not pass through walls, ceilings, or doors and thus allows locating an individual to a specific room. The communication system in the inventions cited are highly efficient because they use the infrared or ultrasonic channel for both tracking and one side of the communications path. A less-efficient alternative, however, is a more conventional two-way radio path coupled with the emission of infrared or ultrasound from the communications unit for tracking. When an incoming telephone call arrives, software associated with the PBX first checks to see if the individual (based on the most recent tracking information) is in his or her office. If yes, the telephone instrument rings as is normally the case. If, however, the individual is not in his or her office, the telephone instrument does not ring (thus reducing environmental noise in the office in situations where ringing is futile), and a message indicating the incoming call, including Calling Line Identification if available, is transmitted via radio to the communications unit. An auditory, vibratory, or visual indication of the incoming call is then provided to the individual. The system also determines what telephone instruments are available nearby the individual (exist and are not busy) and provides these locations as selections on a menu displayed on a liquid crystal diode display that the user can choose. Choices are preferably made by use of a thumbwheel and menu interface, as described in the copending application entitled "Control of Miniature Personal Digital Assistant Using Menu and Thumbwheel" (Ser. No. 08/423,690). Once a choice is made, the response is transmitted back to the PBX and the incoming call routed to the desired telephone instrument.

DESCRIPTION OF THE PREFERRED EMBODIMENTS

Figure 1:
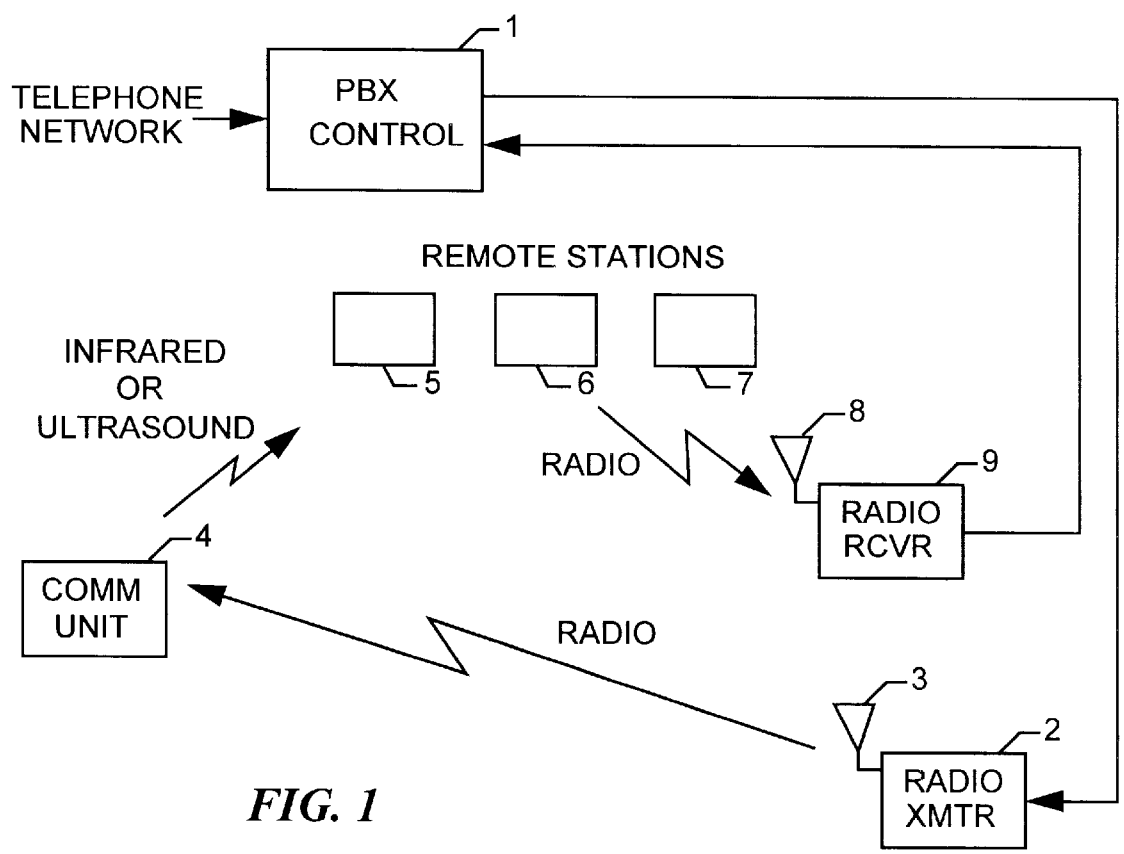
FIG. 1 shows the communications architecture of the system.

FIG. 1 shows the communications architecture of the system. A PBX Control 1 is connected to an external telephone network and to radio transmitter 2. An incoming call will result in a message transmitted by radio via transmitter 2 through antenna 3 to a communications unit 4. Data from the communications unit 4, including responses to selections, acknowledgements, and periodic transmissions with an identification code to allow the system to track the location of the units, is transmitted in infrared or ultrasound (in the embodiment shown here) to one or more of remote stations 5, 6, and 7. Data from the remote stations 5, 6, and 7 are subsequently transmitted via radio (in the embodiment shown here) to antenna 8, radio receiver 9, and received by the PBX control 1.

Figure 2:
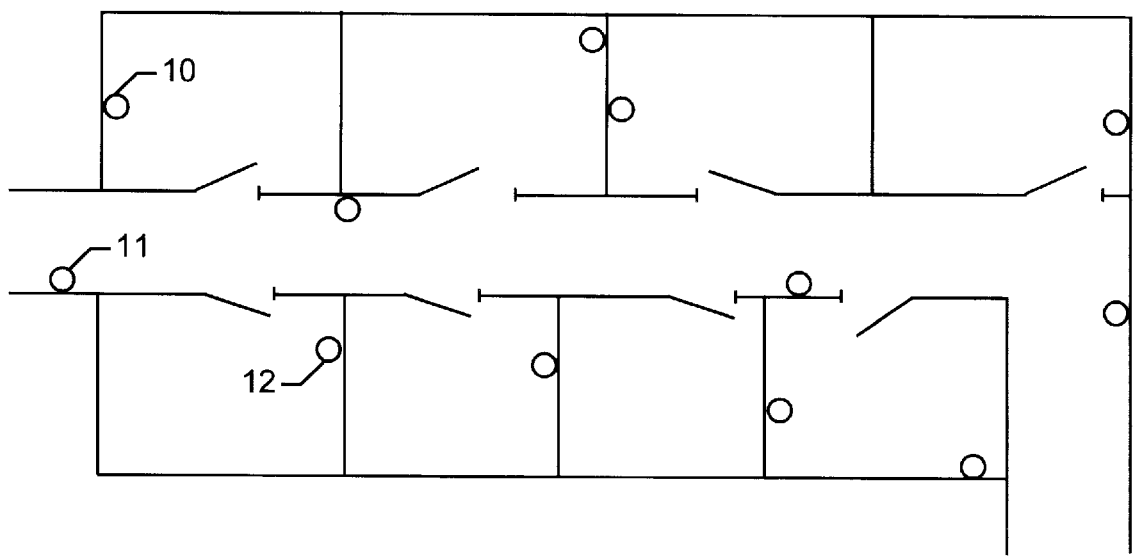
FIG. 2 shows a floor plan of a building in which the system is used.

FIG. 2 shows a floor plan of a building in which the system is used. Remote stations 10, 11, and 12 are shown, with most remote stations contained in physically distinct rooms, but some stations potentially in hallways.

Figure 3A:
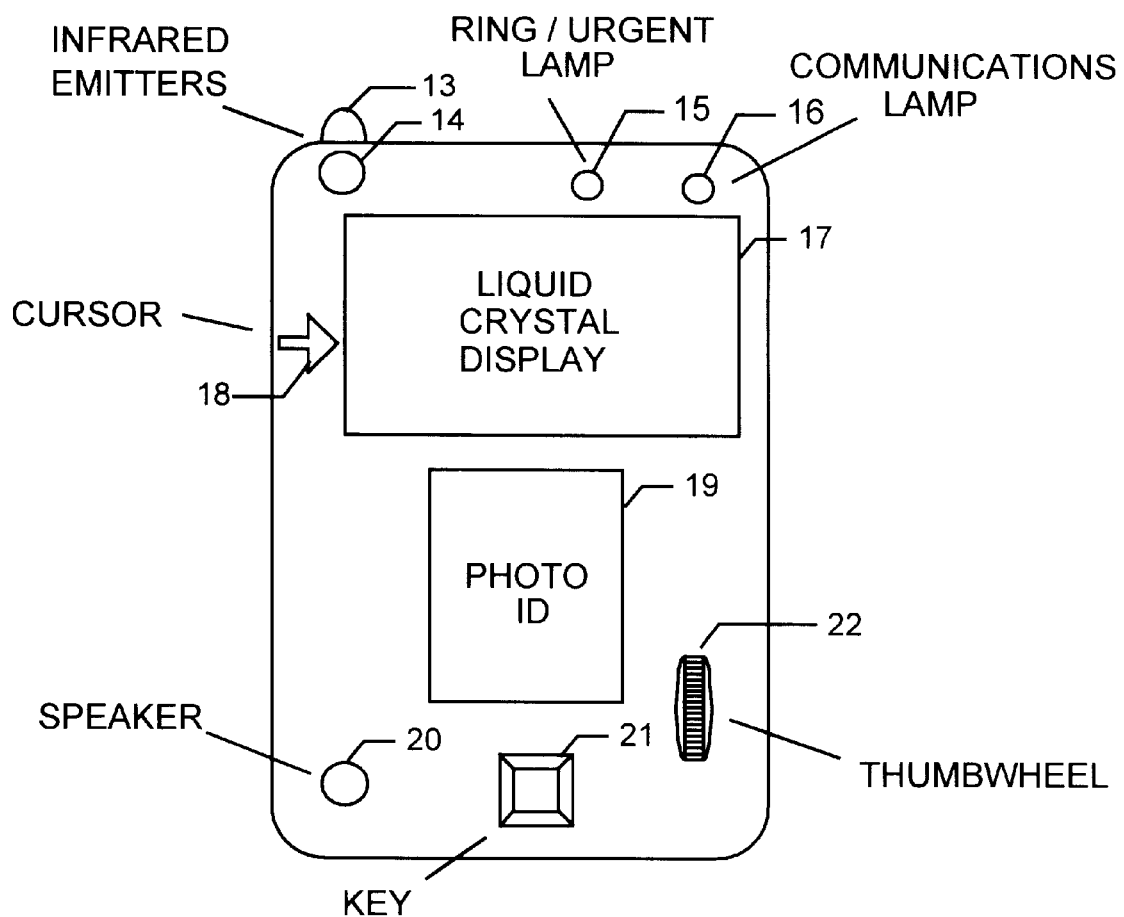
FIGS. 3a, 3b, and 3b show different physical views of a communications unit.
Figures 3B, 3C:
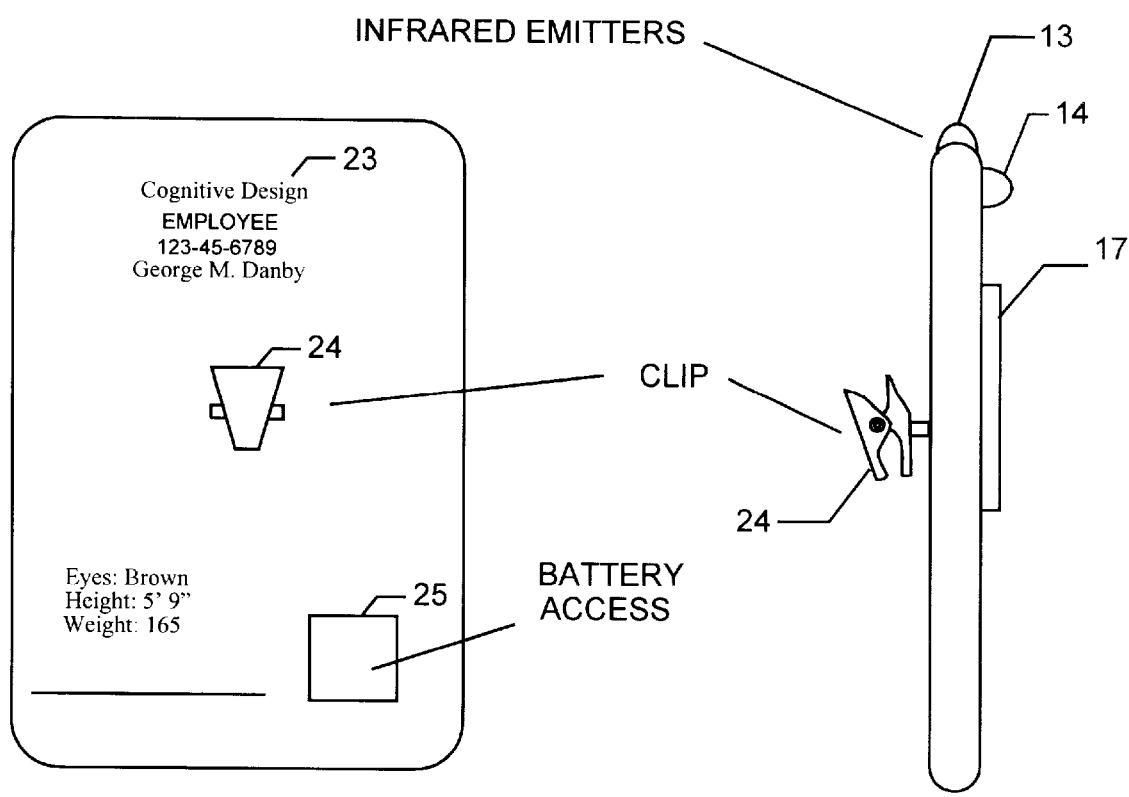

FIGS. 3A, 3B, and 3B show different physical views of a communications unit. FIG. 3A shows the front view of the unit. The unit includes one or more infrared emitters (or ultrasound emitters) 13 and 14, a lamp 15 indicating the ring of a telephone (also used for indicating the priority of a message if an electronic mail message is being received rather than an incoming telephone call, a communications lamp 16 indicating that data is being transmitted, a liquid crystal diode display 17, and a cursor 18 indicating a particular item or line in the display. The cursor 18 can also be replaced by some other indicator, such as using reverse video or a rectangular box around text. A thumbwheel 22 is used in a manner similar to a mouse to move the display and selected item with respect to the cursor, while a key 21 is used to make a selection of a response. The thumbwheel and menu interface is described in more detail in the copending application entitled "Control of Miniature Personal Digital Assistant Using Menu and Thumbwheel" (Ser. No 08/423, 690). In particular, the orientation of the thumbwheel can be modified so that the wheel rotates on an axis perpendicular to the plane of the unit, and in such a case the key can be replaced with an internal switch that allows a user to select a response by moving the thumbwheel and pressing the thumbwheel in a direction toward the communication unit. A photo ID 19 is used if the communication unit is incorporated into an employee ID badge, and a speaker 20 is used for auditory alerting of the user to an incoming telephone call. FIG. 3B shows a rear view of the communications unit, including additional identification information 23, a clip 24, and a battery access compartment 25. FIG. 3C shows a side view of the communications unit, including clip 24, infrared emitters 13 and 14, and LCD display 17.

Figure 4:
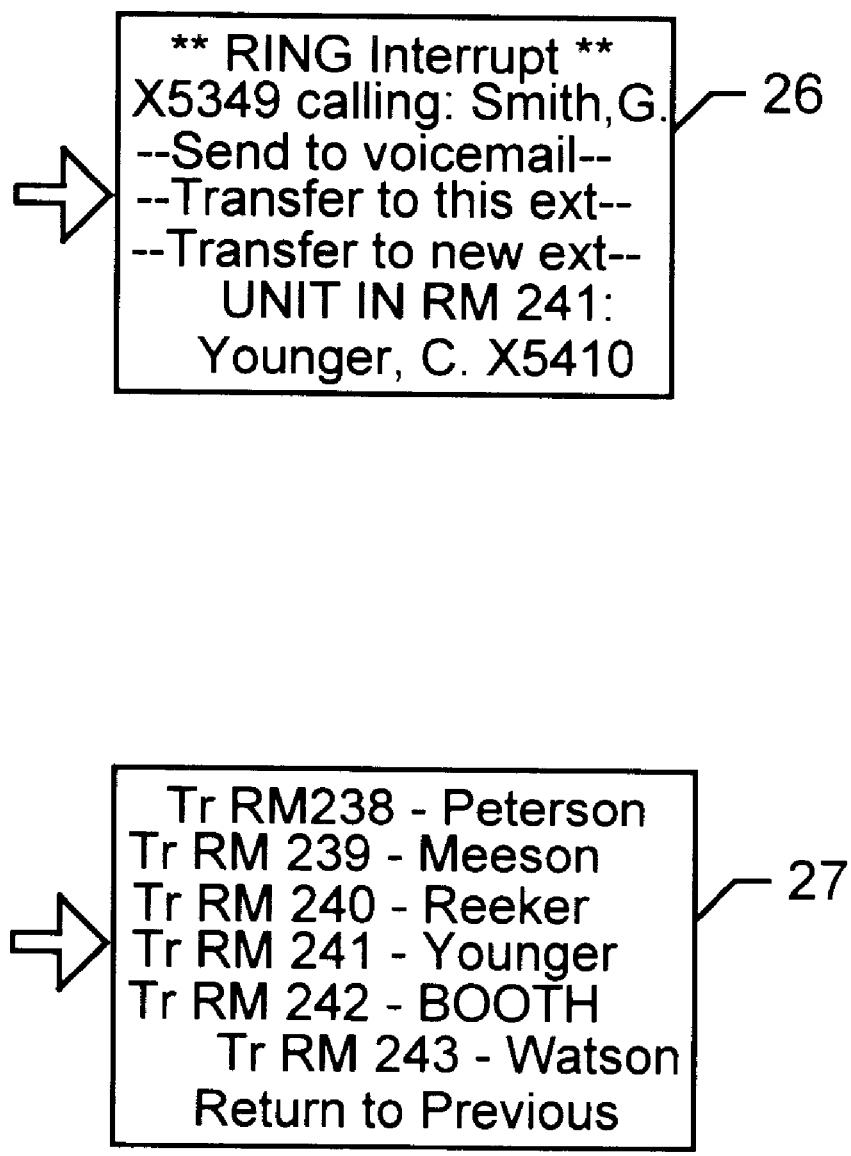
FIG. 4 shows the user interface of the communications unit including responses that can be selected by a user.

FIG. 4 shows the user interface of the communications unit including responses that can be selected by a user. Thus, whenever an incoming call arrives and a message is received at the communications unit to that effect, the current display will be interrupted and replaced by the display 26, with an indication of who is calling if available, and responses for the user, including the ability to send to voicemail, transfer to the extension indicated (that telephone station both available and closest to the individual), or transfer to a new extension (other than the one indicated). In most cases the user will choose "Transfer to this ext", causing the transmission of the selected response back to the PBX control and resulting in transfer of the call to the corresponding telephone station. In some cases the user will choose "Transfer to new ext", resulting in the display of the additional alternatives indicated in display 27.

Figure 5:
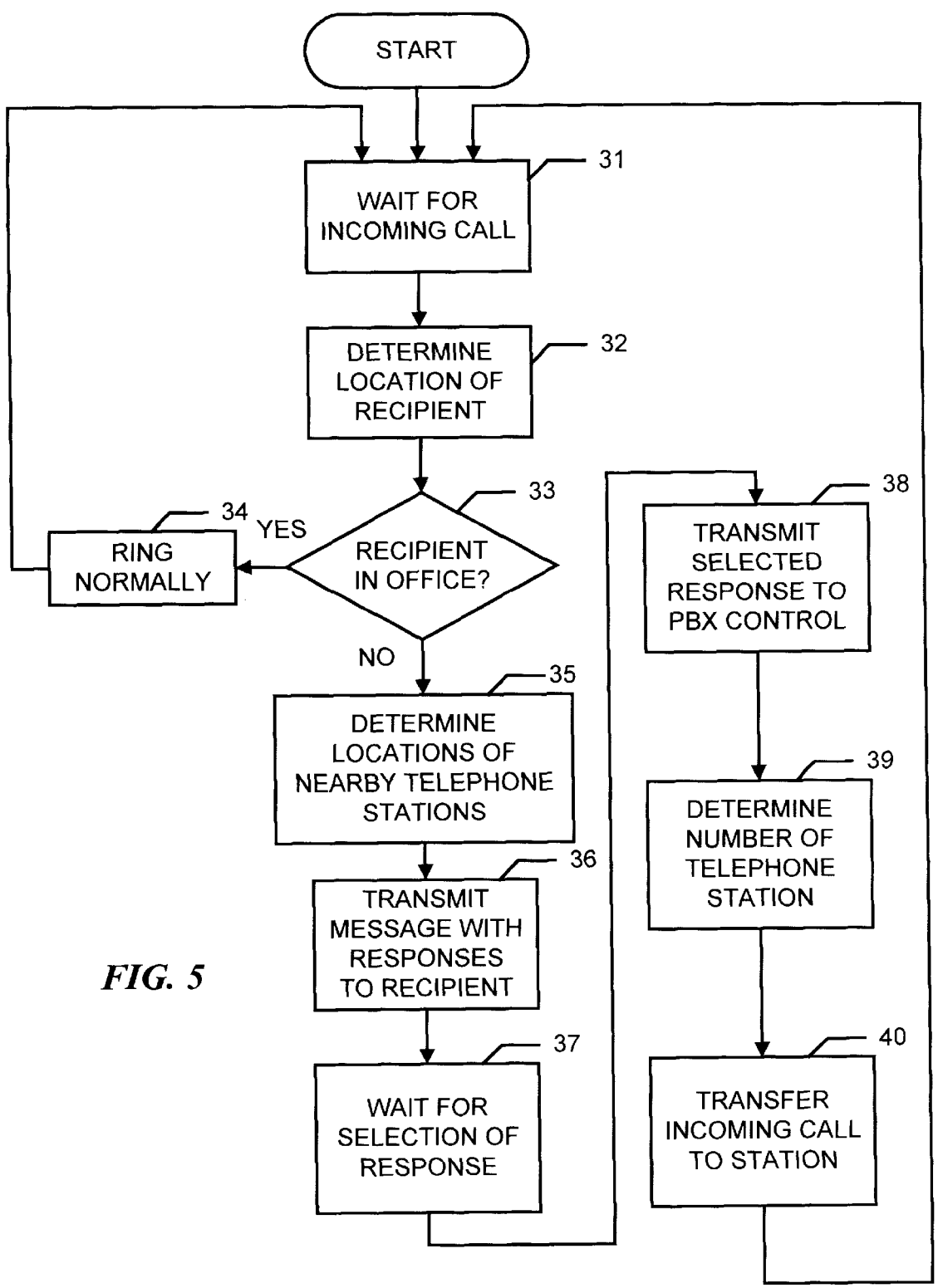
FIG. 5 shows a flowchart of the procedure followed by the system to transfer calls in response to selections made by the user.

FIG. 5 shows a flowchart of the procedure followed by the system to transfer calls in response to selections made by the user. The PBX control waits 31 for an incoming telephone call. As described in U.S. Pat. No. 5,479,408, the communications unit periodically transmits an identity code, which is received at a remote stations 5, 6, or 7 and used to maintain a database with the current location of every individual user. When a call comes in, the location of the recipient is determined 32 based on this database. A test is then made 33 of whether the recipient is in his or her normal office area, using a second database that maps a user to his office location and telephone number. If the recipient is in the normal office area, the PBX control rings the telephone instrument normally 34, and control is passed to await another incoming call. If the recipient is not in the normal office area, the locations are determined 35 of telephone stations that are nearby the present location of the user, assuming, of course, that the user is wearing his or her communications unit. This is done by storing a precompiled list of remote stations that, for each remote station, includes a list of telephone stations and their identities in order of their closeness or convenience. An alternative, of course, is to provide a map organized as a one-dimensional list, with distances indicated between each telephone station, arranged so that a simple algorithm can determine the closest telephone stations to a particular location. The list of telephone stations for the given location is formatted together with information about the identity of the stations as well as the identity of the incoming caller, if it can be determined from Calling Line Identification or the equivalent in the case of a within-building call handled by the PBX. This data is then transmitted 36 to the communications unit. The communications unit then waits 37 for the user to select a response. In some cases only a few responses may be sent to the communications unit, and the user may select a response indicating that additional responses are desired. In addition to responses that allow the transfer of a call to a specific telephone instrument, other responses are also appended, such as that of sending the call to voicemail and sending the call to a particular person (e.g., a secretary or receptionist). Once a response is selected it is transmitted 38 (via the remote stations 5, 6, or 7) to the PBX control. The PBX control then determines the number 39 of the telephone station desired and transfers 40 the incoming call to that station.

I claim:

1. A method for indicating an incoming telephone call to an individual and routing said telephone call to said individual, comprising the steps of:
   initiating said telephone call to a telephone number associated with said individual;
   receiving said telephone call intended for said individual;
   determining the location of said individual in a building by determining the location of a communications unit carried by said individual;
   determining the locations and identity of one or more telephone stations that are physically near said individual in terms of walking distance;
   transmitting a message indicating the receipt of said telephone call by wireless means to said communications unit carried by the individual, together with an identification of one or more telephone stations that are physically near said individual in terms of walking distance;
   indicating to said individual the receipt of said telephone call by a display on said communications unit, together with one or more responses representing telephone stations the call can be routed to;
   selecting one of said responses by said individual;
   transmitting said selected response by wireless means to a PBX system;
   determining the telephone number the call is to be rerouted to, given the selected response;
   transferring the incoming telephone call to the appropriate telephone station.

2. The method of claim 1, wherein the criteria for selecting telephone stations to be presented to the individual includes determining whether the stations are currently on-hook.

3. The method of claim 1, wherein the determination of location of the communications unit is carried out by receiving a signal from the communications unit via a medium selected from the group consisting of infrared light and ultrasonic sound at a fixed station.

4. The method of claim 1, wherein the determination of location of the communications unit is carried out by receiving a signal from the communications unit via infrared light at a fixed station.

5. The method of claim 1, wherein the determination of location of the communications unit is carried out by receiving a signal from the communications unit via ultrasound at a fixed station.

6. The method of claim 1, wherein the determination of telephone stations that are physically near to the individual is carried out by retrieving a list of stations from a memory that have been previously associated with a fixed station at which the transmission from the communications unit has been received.

7. The method of claim 1, wherein the determination of telephone stations that are physically near to the individual is calculated by reference to a list that indicates the walking distance between telephone stations and fixed stations at which the transmission from the communications unit has been received.

8. An apparatus for indicating an incoming telephone call to an individual and routing said telephone call to said individual, comprising:
   means for initiating said telephone call to a telephone number associated with said individual;
   means for receiving said telephone call intended for said individual;
   means for determining the location of said individual in a building by determining the location of a communications unit carried by said individual;
   means for determining the locations and identity of one or more telephone stations that are physically near said individual in terms of walking distance;
   means for transmitting a message indicating the receipt of said telephone call by wireless means to said communications unit carried by the individual, together with an identification of one or more telephone stations that are physically near said individual in terms of walking distance;
   means for indicating to said individual the receipt of said telephone call by a display on said communications unit, together with one or more responses representing telephone stations the call can be routed to;
   means for selecting one of said responses by said individual;
   means for transmitting said selected response by wireless means to a PBX system;
   means for determining the telephone number the calls is to be rerouted to, given the selected response;
   means for transferring the incoming telephone call to the appropriate telephone station.

9. The apparatus of claim 8, wherein the criteria for selecting telephone stations to be presented to the individual includes determining whether the stations are currently on-hook.

10. The apparatus of claim 8, wherein the determination of location of the communications unit is carried out by receiving a signal from the communications unit via a medium selected from the group consisting of infrared light and ultrasonic sound at a fixed station.

11. The apparatus of claim 8, wherein the determination of location of the communications unit is carried out by receiving a signal from the communications unit via infrared light at a fixed station.

12. The apparatus of claim 8, wherein the determination of location of the communications unit is carried out by receiving a signal from the communications unit via ultrasound at a fixed station.

13. The apparatus of claim 8, wherein the determination of telephone stations that are physically near to the individual is carried out by retrieving a list of stations from a memory that have been previously associated with a fixed station at which the transmission from the communications unit has been received.

14. The apparatus of claim 8, wherein the determination of telephone stations that are physically near to the individual is calculated by reference to a list that indicates the walking distance between telephone stations and fixed stations at which the transmission from the communications unit has been received.

* * * * *